United States Patent [19]

Paige et al.

[11] 4,039,507

[45] Aug. 2, 1977

[54] INCORPORATION OF FINELY DIVIDED FUNCTIONAL SOLIDS INTO OLEFIN

[75] Inventors: William P. Paige; John A. Barber, both of Midland, Mich.

[73] Assignee: The Dow Chemical Company, Midland, Mich.

[21] Appl. No.: 610,588

[22] Filed: Sept. 5, 1975

[51] Int. Cl.$^2$ ................................................ C08K 9/10
[52] U.S. Cl. ............................ 260/42.46; 106/308 M; 260/17.4 R; 260/17.4 CL; 260/28.5 A; 260/31.8 PQ; 260/33.6 PQ; 260/42.21; 260/42.25; 260/42.56; 260/45.95 F
[58] Field of Search ............... 260/42.46, 42.56, 42.21; 106/308 M

[56] References Cited

U.S. PATENT DOCUMENTS

| 3,455,871 | 7/1969 | Coover et al. | 260/42.56 |
| 3,857,813 | 12/1974 | Stain et al. | 260/42.46 |

*Primary Examiner*—James H. Derrington
*Attorney, Agent, or Firm*—R. B. Ledlie; M. S. Jenkins

[57] ABSTRACT

A finely divided functional solid is readily incorporated into olefin polymers such as polyethylene, polypropylene and polystyrene by blending a concentrate of the functional solid in a carrier of an ethylene/butene-1 copolymer with the olefin polymer. Thus prepared, these blends containing the finely divided solid are ready for fabrication into shaped articles.

7 Claims, No Drawings

INCORPORATION OF FINELY DIVIDED FUNCTIONAL SOLIDS INTO OLEFIN

BACKGROUND OF THE INVENTION

This invention relates to the incorporation of finely divided functional solids into normally solid olefin polymers.

In the production of olefin polymer articles containing solid additives such as pigments, extenders, dies and fillers, it has been the practice in the art to combine such an additive in finely divided form with pre-extruded pellets or granules of olefin polymers in an extrusion or similar melt blending operation. In order to achieve the desired degree of uniformity of dispersion of the finely divided solid throughout the olefin polymer, it is generally necessary to reextrude or reblend the above combination a number of times. Attempts to eliminate the need for reblending and to eliminate dusting problems caused by the finely divided solid have often involved the use of premixing techniques wherein the functional solid is first combined with a polymeric carrier to form a concentrate and subsequently blended with the desired olefin polymer.

Unfortunately, copolymers that perform suitably as carriers for polymers of aliphatic olefins are generally not sufficiently compatible with polystyrene and other polymers of aromatic olefins to be suitably employed as carriers. The result of such incompatibility is delamination occurring at interfaces between the carrier of the concentrate and the polymer being pigmented which causes a loss of physical strength. In order to avoid such problems, it has been necessary to prepare concentrates having different polymers as carriers for each different polymer to be pigmented.

As would be expected, a single color concentrate, a so-called universal concentrate, that could be suitably combined with any olefin polymer whether it be aliphatic or aromatic is highly desirable.

SUMMARY OF THE INVENTION

In one aspect, the present invention is a concentrate comprising as the carrier, a copolymer of ethylene with from about 4 to about 20 weight percent of butene-1 and a functionally effective amount of a finely divided functional solid.

In another aspect, the present invention is an improved method for incorporating a finely divided functional solid into an olefin polymer such as polyethylene or polystyrene. This method comprises blending the olefin polymer with the concentrate in an amount sufficient to provide a functionally effective quantity of a finely divided solid in the resultant blend. Practice of this method permits the uniform dispersion of functional solid into an olefin polymer without significantly reducing the physical properties of the olefin polymer.

In yet a further aspect, the present invention is a blend comprising the olefin polymer and an amount of the concentrate which is effective to supply a functionally effective quantity of the functional solid to the resultant blend.

For the purposes of this invention, a "functionally effective amount" is an amount of finely divided solid which imparts to the olefin polymer the property which is characteristic of the solid to provide. For example, a functional amount of a pigment would be an amount effective to cause pigmentation (i.e., a pigmenting amount), and a functionally effective amount of a stabilizer woule be an amount effective to cause stabilization (i.e., a stabilizing amount).

The novel concentrates of the present invention are unique in that they can be combined with the olefin polymer in a single-step operation in which they are fabricated into the desired shaped article. The resultant shaped article surprisingly contains a uniform dispersion of the pigment in the olefin polymer and has physical characteristics comparable to the olefin polymer containing no additive. A very significant and surprising advantage of the concentrates of the instant invention is the equal ease with which such concentrates can be combined with either polyethylene and other aliphatic olefin polymers or with polystyrene and similar aromatic olefin polymers. It is surprising that such concentrates are equally compatible with such significantly different olefin polymers.

The novel blends of the instant invention are useful in the production of shaped articles of olefin polymers which necessarily contain solid additives.

DETAILED DESCRIPTION OF THE EMBODIMENTS

The term "olefin polymer" means polymers of aliphatic or aromatic monoolefins in which the backbone chain of the polymer macromolecule is substantially a non-crosslinked hydrocarbon chain with aliphatic or aromatic substituents. Exemplary olefin polymers include polymers of ethylene, propylene, butene-1 and higher 1-alkenes having from 5 to 10 carbon atoms as well as polymers of styrene, ar(t-butyl)styrene, alpha-methylstyrene, ar-chlorostyrene, ar-bromostyrene, ar-methylstyrene and other monovinylidene aromatic monomers. It is understood that the term "olefin polymers" includes homopolymers, copolymers and interpolymers of the foregoing aliphatic and aromatic olefins as well as mixtures and blends of such homopolymers and copolymers.

The ethylene/butene-1 copolymers suitably employed as the carrier in the concentrate of the present invention are copolymers of ethylene containing from 4 to about 20, preferably from about 6 to about 15, especially from about 8 to 15, weight percent, of butene. Such copolymers have melt flow viscosities as determined by ASTM D-1238-65T (E) in the range from about 0.1 to about 10 decigrams per minute, preferably from about 0.5 to about 1 decigrams per minute, and absolute densities in the range from about 0.941 to about 0.959 gram/cubic centimeter (g./cc.), preferably from about 0.945 to about 0.954 g./cc., especially from 0.948 to 0.952 g./cc. Methods for preparing such copolymers are well known to those skilled in the art, for example, U.S. Pat. No. 3,113,115 and U.S. Pat. No. 3,051,690.

Preferred copolymers are binary copolymers in the form or normally extrudable, free flowing powders having a bulk density in the range from about 25 to about 35 pounds per cubic foot, preferably from about 28 to about 32 pounds per cubic foot. The particles of such powders are free flowing, porous particles having individual sizes within the range from about 50 to about 800 micrometers, preferably from about 300 to about 400 micrometers, and generally roughened surfaces. Uniquely, the particles of these preferred copolymers have substantially open or free space within the particles themselves. On the average, as much as about 50 volume percent and as little as about 20 volume percent based on total particle volume is free or open space occurring as pockets within the particles and as pores or openings on the particle surfaces. Especially preferred copolymer powders have flowability measured as angle of repose in the range from about 24 to about 30 degrees and an open space (or free volume) within individual particles in the range from about 25 to about 45 volume percent based on total particle volume. Screen analysis of one example of an especially preferred copolymer powder indicates a particle size distribution in weight percent of total powder as follows: 1.6–14.3% greater than 540 micrometers, 72–87.6% from about 320 to about 540 micrometers, 4.7–20.1% from about 248 to about 320 micrometers, 0.8–3.3% from about 175 to about 248 micrometers, 0.1–0.6% from about 147 to about 175 micrometers, 0.2–1.2% less than about 147 micrometers. In addition, especially preferred copolymer powders have surface areas in the range from about 2 to about 4 square meters per gram.

Such preferred copolymer powders are most advantageously made by a low pressure polymerization process carried out in the presence of a special titanium containing catalyst at slurried polymerization temperatures. An especially preferred process for making these preferred copolymer powders is disclosed in U.S. Pat. Application Ser. No. 115,881 filed Feb. 16, 1971, now U.S. Pat. No. 3,907,760 and U.S. Pat. No. 3,857,813, both of which are hereby incorporated by reference in their entirety. It is understood, however, that other processes capable of producing high bulk density olefin polymer powders having similar bulk densities and free volumes as set forth hereinbefore are also advantageously employed.

Solids suitably employed in the concentrate of this invention are finely divided, normally solid, functional materials such as pigments, dyes, fillers, stabilizers, lubricants, antistatic agents, fire retardants, combinations thereof and the like. Illustratively, such materials comprise comparatively large particle size solids, for example, stabilizers such as ultraviolet stabilizers as 2-hydroxy-4-n-octoxybenzophenone having particle sizes in the range from about 75 to about 600 micrometers. Such materials also comprise somewhat smaller size solids, including, for example, pigments such as titanium dioxide, carbon black, ultramarine blue, cadmium orange, zinc oxide, iron oxide and similar materials, of particle size in the range from about 5 micrometers down to particles having an average diameter less than 1 micrometer, e.g., about 0.2 micrometer. Other suitable solids include magnesium carbonate, calcium carbonate, silicon dioxide, asbestos china clay, lignite, anthracite coal, bituminous coal, silicates, wood dust, cork dust, cellulose and a wide variety of coloring agents. In addition, other fillers, fire retardants, stabilizers, etc., which are suitable include finely divided functional solids conventionally incorporated into thermoplastic materials.

In the practice of the present invention, a functionally effective amount, usually from about 10 to about 120 weight parts, of finely divided functional solid is blended with 100 weight parts of the ethylene/butene copolymer, preferably in the form of the powder defined hereinbefore. Blending is suitably accomplished by dry blending the finely divided solid with the preferred copolymer powder such as by tumble blending the ingredients in a closed container. In order to incorporate large amounts of finely divided solid (e.g. from about 60 to about 120 weight parts) into 100 weight parts of the copolymer powder to prepare concentrates of finely divided solid and the copolymer, it is desirable to employ a high intensity blending procedure. An illustrative high intensity blending procedure involves blending the copolymer powder with finely divided solid in a high speed rotating blade mixer capable of rotating mixing blades at 800 rpm or faster. Such high speed mixing devices have rotational blade tip speeds exceeding about 200 inches per second ranging up to as high as 2500 inches per second. At such blade speeds, e.g., those accomplished at 1,000 to 3,000 rpm, the finely divided solid is forced into the open spaces of the preferred copolymer powder particles in such a manner that the relatively large amounts of finely divided solid become permanently entrapped in the free volume of the copolymer powder. As a result of such permanent entrapment, the resulting concentrate can be handled extensively without the formation of substantial amounts of dust of the finely divided solid. In fact, it is found that such filled powders can be conveyed by air conveying means without loss of appreciable amounts of the finely divided solid from the copolymer powder.

In an especially preferred procedure for incorporating the finely divided solid into the copolymer powder, the resulting concentrate is subsequently coated with a viscous liquid, preferably an olefinic material, and if desired, with additional finely divided solid. Coating of the powdered concentrate with such liquids is suitably accomplished by adding the liquid during the blending of the finely divided solid and copolymer powder or by subsequently mixing the concentrate with the liquid. Suitable liquids include mineral oil, oils of low molecular weight olefin polymers, waxes, bonding agents such as low molecular weight polymers of α-methylstyrene, e.g., those disclosed in U.S. Pat. No. 3,057,751, plasticizers such as dioctyl adipate and similar waxy or oily materials. When used, such liquids are employed in amounts from about 0.25 to about 10 weight percent based on the copolymer powder are employed.

In addition to the foregoing procedures using preferred copolymer powders, suitable concentrates of the ethylene/butene-1 copolymer and finely divided solid can be prepared by a wide variety of other procedures that are well known in the art. In fact, although not as preferred, the copolymer may be in the form of normal slurry powder, in solution or in heat plastified form when combined with the functional solid to provide the desired concentrate. In general, however, the finely divided solid is preferably blended with the copolymer powder having the aforementioned high bulk density and free volume is at room temperature, although higher or lower temperatures may be employed.

The resultant concentrate is now readily combined with virgin olefin polymer such as polyethylene or polystyrene using conventional procedures such as feeding the concentrate into the olefin polymer during extrusion, injection molding, rotational molding or a comparable fabricating operation. The resultant olefin polymer contains the functional solid uniformly dispersed therein. Alternatively, the concentrate may be extruded into pellets which may subsequently be blended with virgin polymer in a conventional manner. It is found that the copolymer is completely compatible in either the polyethylene or comparable aliphatic olefin polymer or in the polystyrene or comparable aromatic olefin polymer.

The following example is given to illustrate the invention and should not be construed as limiting its scope. Unless otherwise indicated, all parts and percentages are by weight.

EXAMPLE

A high bulk density, ethylene/butene-1 (92/8) copolymer powder is prepared according to the procedure set forth in U.S. pat. application Ser. No. 115,881 filed Feb. 16, 1971. The powder of the resultant copolymer particles has a bulk density of 30 pounds per cubic foot, and average particle diameter of 300–400 micrometers, and an angle of repose of 29°. Angle of repose is the angle formed between the plane of a horizontal substrate and the plane tangential to the surface of a conical pile of the powder formed by dropping a 260 gram portion of the powder through a funnel having a 5/16 inch opening onto the horizontal substrate. A lower angle of repose indicates higher flowability of the powder. In addition, the copolymer has an absolute density of 0.950 g./cc. and a melt index of 0.4 decigrams per minute. Examination of the particles of the high bulk density copolymer powder indicates the particles to be generally porous agglomerates having rough surfaces. Careful examination of these particles using cross sectional views and gravimetric analysis indicate an average free volume of more than 20 volume percent based on the total volume of the particles.

A 2-part portion of the high bulk density copolymer powder and 1-part of titanium dioxide having an average particle size of 0.2–0.4 micrometer are blended in a high speed blender (Prodex Model having a capacity of ½ cubic foot and made by *Prodex-Henschel Corporation*) for 2 minutes at 1800 rpm. A 0.1-part portion of a bonding agent consisting of a 60/40 mixture of dioctyl adipate and oligomers of styrene including dimers, trimers tetramers is added to the aforementioned blended concentrate and mixed therewith at 1800 rpm for 30 seconds. The resulting concentrate is a dust free, free flowing, extrudable powder which readily combines with virgin polyethylene or polystyrene in the ratio from about 1 to about 6 parts per 100 parts of polymer in extrusion or molding devices to form a uniformly pigmented fabricated material. Similar results are obtained when the copolymer is blended with other pigments such as lead chromate, phthalocyamine pigments, anthraquimone based dyes and the like.

For purposes of comparison, the blending procedure of the foregoing example is repeated substituting a high density polyethylene powder for the ethylene/butene copolymer. When the resultant concentrate is compounded with polystyrene, the resulting composition is a hetereogenous mass exhibiting observable color variations.

What is claimed is:

1. A concentrate comprising from about 10 to about 120 weight parts of a finely divided functional solid selected from group consisting of pigments, dyes and combinations thereof and as a carrier, 100 weight parts of an ethylene/butene-1 copolymer having (1) from about 8 to about 15 weight percent based on the copolymer of copolymerized butene-1, (2) a melt flow viscosity as determined by ASTM D-1238-65-T (condition E) in the range from about 0.1 to about 10 decigrams per minute and (3) an absolute density in the range from about 0.941 to about 0.959 grams per cc.

2. The concentrate of claim 1 wherein the copolymer is in the form of an extrudable powder characterized by a bulk density in the range from about 25 to about 35 pounds per cubic foot, particles having particle size predominantly in the range from about 50 to about 800 micrometers, and said particles having rough surfaces in porosity sufficient to provide an average free volume within the individual particles in the range from about 20 to about 50 volume percent based on the total volume of the particles of the powder.

3. The concentrate of claim 2 comprising from about 10 to about 60 weight percent of the finely divided solid and at least 40 weight percent of the copolymer having from about 8 to 12 weight percent of polymerized butene-1.

4. A method for pigmenting an olefin polymer which comprises blending the olefin polymer with the concentrate of claim 2.

5. The method of claim 2 wherein the olefin polymer is polystyrene.

6. The concentrate of claim 2 wherein the finely divided solid is a pigment.

7. The concentrate of claim 6 wherein the pigment is selected from the group consisting of titanium dioxide, carbon black, ultramarine blue, cadmium orange, zinc oxide and iron oxide.

* * * * *